United States Patent
Weigang et al.

(10) Patent No.: US 8,185,226 B2
(45) Date of Patent: May 22, 2012

(54) METHOD AND SYSTEM FOR SCHEDULING A STREAM OF PRODUCTS IN A MANUFACTURING ENVIRONMENT BY USING PROCESS-SPECIFIC WIP LIMITS

(75) Inventors: Joerg Weigang, Dresden (DE); Robert Ringel, Dresden (DE); Steffen Kalisch, Radebeul (DE); Thomas Quarg, Moritzburg (DE)

(73) Assignee: Globalfoundries Inc., Grand Cayman (KY)

( * ) Notice: Subject to any disclaimer, the term of this patent is extended or adjusted under 35 U.S.C. 154(b) by 1031 days.

(21) Appl. No.: 12/119,042

(22) Filed: May 12, 2008

(65) Prior Publication Data
US 2009/0037012 A1   Feb. 5, 2009

(30) Foreign Application Priority Data
Jul. 31, 2007 (DE) .................. 10 2007 035 835

(51) Int. Cl.
*G06F 19/00* (2006.01)
(52) U.S. Cl. .......... 700/101; 700/99; 700/100; 700/102; 700/103; 700/108; 700/111
(58) Field of Classification Search .............. 700/95, 700/97, 99–101, 103, 108, 111, 102
See application file for complete search history.

(56) References Cited

U.S. PATENT DOCUMENTS

| | | | |
|---|---|---|---|
| 4,888,692 A * | 12/1989 | Gupta et al. | 700/96 |
| 5,093,794 A * | 3/1992 | Howie et al. | 700/100 |
| 5,544,350 A * | 8/1996 | Hung et al. | 700/111 |
| 5,586,021 A * | 12/1996 | Fargher et al. | 700/100 |
| 5,612,886 A * | 3/1997 | Weng | 700/101 |
| 5,748,478 A * | 5/1998 | Pan et al. | 700/99 |
| 5,751,580 A * | 5/1998 | Chi | 700/101 |
| 5,826,238 A * | 10/1998 | Chen et al. | 705/7.22 |
| 5,880,960 A * | 3/1999 | Lin et al. | 700/99 |
| 5,889,673 A * | 3/1999 | Pan et al. | 700/97 |
| 6,263,253 B1 * | 7/2001 | Yang et al. | 700/99 |
| 6,311,094 B1 * | 10/2001 | Iriuchijima et al. | 700/100 |
| 6,434,440 B1 * | 8/2002 | Teranishi et al. | 700/97 |
| 6,480,756 B1 * | 11/2002 | Luh et al. | 700/108 |
| 6,574,521 B2 * | 6/2003 | Hsu | 700/99 |
| 7,006,885 B2 * | 2/2006 | Chen | 700/102 |
| 7,072,731 B1 * | 7/2006 | Barto et al. | 700/102 |
| 7,085,614 B1 * | 8/2006 | Gartland et al. | 700/100 |
| 7,151,972 B2 * | 12/2006 | Denton et al. | 700/99 |
| 7,218,980 B1 * | 5/2007 | Orshansky et al. | 700/99 |

(Continued)

OTHER PUBLICATIONS

English Translation of Japanese Publication No. 11-262843; 21 pages; Published on Sep. 28, 1999; Takeuchi Hiroyuki; printed from Japanese Patent Office website on Apr. 24, 2011.*

(Continued)

*Primary Examiner* — Ronald Hartman, Jr.
(74) *Attorney, Agent, or Firm* — Williams, Morgan & Amerson

(57) ABSTRACT

By defining a section-related WIP limit or a throughput-related WIP limit, an efficient "look ahead" characteristic may be established to efficiently control the WIP in a complex manufacturing environment, such as a semiconductor facility. The respective critical WIP values may enable efficient reduction of priority of products moving towards an increased WIP queue, thereby reducing or substantially avoiding the release of products that are expected to run into the WIP queue. In this way, the efficiency of shared tools may be increased, since process capacity no longer required for the processing products running into WIP queues may be allocated for other operations.

21 Claims, 2 Drawing Sheets

U.S. PATENT DOCUMENTS

| | | | |
|---|---|---|---|
| 7,239,930 B2 * | 7/2007 | Burda et al. | 700/100 |
| 7,392,105 B2 * | 6/2008 | Burda et al. | 700/101 |
| 7,536,233 B1 * | 5/2009 | Krishnaswamy | 700/100 |
| 7,937,177 B2 * | 5/2011 | Gifford et al. | 700/100 |
| 2002/0165633 A1 * | 11/2002 | Hsu | 700/99 |
| 2005/0096770 A1 * | 5/2005 | Chua et al. | 700/102 |
| 2005/0154625 A1 * | 7/2005 | Chua et al. | 705/7 |
| 2005/0203655 A1 * | 9/2005 | Tsai | 700/101 |
| 2006/0106477 A1 * | 5/2006 | Miyashita | 700/103 |
| 2006/0149404 A1 * | 7/2006 | Denton et al. | 700/99 |
| 2006/0235557 A1 * | 10/2006 | Knight et al. | 700/103 |
| 2006/0271220 A1 * | 11/2006 | Burda et al. | 700/99 |
| 2007/0088449 A1 * | 4/2007 | Denton et al. | 700/99 |
| 2007/0239300 A1 * | 10/2007 | Burda et al. | 700/100 |
| 2007/0255440 A1 * | 11/2007 | Burda et al. | 700/101 |
| 2008/0183324 A1 * | 7/2008 | Krisnamuthi et al. | 700/112 |
| 2009/0005896 A1 * | 1/2009 | Gifford et al. | 700/121 |
| 2011/0238537 A1 * | 9/2011 | Wilson et al. | 705/29 |
| 2011/0282475 A1 * | 11/2011 | Ghosh et al. | 700/100 |

OTHER PUBLICATIONS

Managing WIP and Cycle Time with the help of Loop Control; Kalisch et al., 7 pages, from the Proceedings of the 2008 Winter Simulation Conference.*

* cited by examiner

METHOD AND SYSTEM FOR SCHEDULING A STREAM OF PRODUCTS IN A MANUFACTURING ENVIRONMENT BY USING PROCESS-SPECIFIC WIP LIMITS

BACKGROUND OF THE INVENTION

1. Field of the Invention

Generally, the present disclosure relates to manufacturing processes, and, more particularly, to the scheduling of product streams in a manufacturing environment, such as a semiconductor facility, in which one or more different product types are processed by process and metrology tools based on scheduling regimes.

2. Description of the Related Art

Today's global market forces manufacturers of mass products to offer high quality products at a low price. It is thus important to improve yield and process efficiency to minimize production costs. This holds especially true in industrial fields, in which highly complex process tools operate on complex products according to specified process parameters that may vary between different product types. A prominent example in this respect represents the field of semiconductor fabrication, since, here, it is essential to combine cutting-edge technology with mass production techniques. It is, therefore, the goal of semiconductor manufacturers to reduce the consumption of raw materials and consumables while at the same time improve process tool utilization. The latter aspect is especially important since, in modern semiconductor facilities, equipment is required which is extremely cost-intensive and represents the dominant part of the total production costs.

Integrated circuits, as one example for a mass product, are typically manufactured in automated or semi-automated facilities, thereby passing through a large number of process and metrology steps to complete the device. The number and the type of process steps and metrology steps a product, such as a semiconductor device, has to go through depends on the specifics of the product to be fabricated. For example, a typical process flow for an integrated circuit may include a plurality of photolithography steps to image a circuit pattern for a specific device layer into a resist layer, which is subsequently patterned to form a resist mask for further processes for structuring the device layer under consideration by, for example, etch or implant processes, deposition processes, heat treatments, cleaning processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration.

In many production plants, such as semiconductor facilities, usually a plurality of different product types are manufactured at the same time, such as memory chips of different design and storage capacity, CPUs of different design and operating speed and the like, wherein the number of different product types may even reach a hundred and more in production lines for manufacturing ASICs (application specific ICs). Since each of the different product types may require a specific process flow, specific settings in the various process tools, such as different mask sets for the lithography, different process parameters for deposition tools, etch tools, implantation tools, chemical mechanical polishing (CMP) tools, furnaces and the like, may be necessary. Consequently, a plurality of different tool parameter settings and product types may be encountered simultaneously in a manufacturing environment.

Hereinafter, the parameter setting for a specific process in a specified process tool or metrology or inspection tool may commonly be referred to as process recipe or simply as recipe. Thus, a large number of different process recipes, even for the same type of process tools, may be required which have to be applied to the process tools at the time the corresponding product types are to be processed in the respective tools. However, the sequence of process recipes performed in process and metrology tools or in functionally combined equipment groups as well as the recipes themselves may have to be frequently altered due to fast product changes and highly variable processes involved. As a consequence, the tool performance is a very critical manufacturing parameter as it significantly affects the overall production costs of the individual products, wherein one important aspect of the tool performance is throughput.

Therefore, in the field of semiconductor production, various strategies are practiced in an attempt to optimize the stream of products for achieving a high yield with moderate consumption of raw materials. In semiconductor plants, substrates are usually handled in groups, called lots, wherein, in a frequently encountered strategy, the dispatching of a sequence of lots for a given group of process tools, in which at least a part of the manufacturing process is to be performed, is determined on the basis of the current state of the lots and the tools, such that an efficient processing of the lots may be achieved. Efficiency in terms of lot processing may be understood as a processing regime, in which throughput of the tools under consideration is maintained at a high level while also taking into consideration product-specific criteria, such as short cycle time, meeting customers' demands and the like. Thus, a so-called dispatch list may be established for each process under consideration when demanded by an operator or an automated supervising system, which may describe the sequence of releasing the various lots designated for the process under consideration in an attempt to finally obtain efficient routing of the released lots through the process flow under consideration.

When passing through the process flow under consideration, the respective lots may be "distributed" along the process line according to their manufacturing stage and may be queued at respective process tools, waiting for the further processing in a dedicated process tool. The material currently processed in a tool or currently waiting for processing in the queue associated with the process tool under consideration is referred to as "work in progress" (WIP). During the specific process flow a lot has to undergo, the same process tool or tool group may have to be used repeatedly, although at different points in the process flow. For example, for many lithography processes, the same process tool(s) may be used to define different device layers, as previously described, so that a corresponding queue "in front" of a lithography module may comprise, in addition to substrate groups belonging to different product types, lots of the same product type at different manufacturing stages. Due to the complexity of the entire process flow, the product lots waiting for processing at a specific process tool, even when representing the same product type, may be present in very different amounts, which may not be correlated to the number of lots corresponding to a previous or subsequent manufacturing stage, although all lots of the product type under consideration have to pass through the dedicated process flow for this product type. For example, the flow of lots through the process line may be considered as a highway with heavy traffic, wherein, at different positions between an origin and the destination, very different traffic densities may occur, in particular when many sections of the distance between the origin and the destination have to passed several times. The conventional dispatch regimes take into consideration the situation at the respective points, i.e., process tools, in order to attempt to optimize the product stream through this process tool or process tool group, wherein the dispatch list may represent the priority for the processing of the various lots at this point according to the above-specified criteria. However, in addition to such important aspects, such as tool utilization, providing products on demand and the like, other criteria may have a strong influence on the overall performance of a manufacturing environment. For instance, the WIP in the facility may not be maintained at an arbitrarily high value, since this may result in reduced flexibility for responding to changes of factors, such as customer demands, global economic situation and the like. For example, in semiconductor facilities, the various processes may be highly interrelated in that the process result may depend on the queue time of a specific process so that a high amount of WIP at this process may result in significant losses, when the queue time may reach a non-tolerable high value, which may be referred to as queue time violation, due to a non-predictable event, such as tool failure and the like.

Hence, frequently, additional strategies may be applied in complex manufacturing environments that are aiming at controlling the WIP according to predefined criteria, such as maintaining the WIP constant (CONWIP), tightly controlling the WIP between pairs of adjacent operations and the like. These "supervising" control strategies may overrule the "local" control of the work stream at the individual process tools so as to control the WIP in the system. However, in the complex system of a semiconductor facility, a restriction of the WIP on the basis of conventional regimes as described above may be very difficult to implement due to the high number of different tool characteristics associated with process tools, such as furnaces, lithography tools, implanters, polish tools and the like, due to the high number of process steps, the variability of the availability of the process tools, the high investment costs and in particular the high number of re-entrant processes.

The present disclosure is directed to various methods and systems that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to methods and techniques for efficiently controlling the "work in progress" (WIP) in a complex manufacturing environment, such as a semiconductor facility configured to produce microstructure devices, in which a plurality of highly complex and advanced process operations have to be performed on the basis of one or more product types according to a specified process flow. For this purpose, the situation in the process flow with respect to each of the plurality of process operations may be monitored so as to obtain process information relating to the current number of products to be processed or being processed in a respective process operation, thereby obtaining a global view of increased portions of the process flow. Additionally, appropriately defined limits or threshold values may be defined and used for characterizing a desirable range of the work in progress to enable an efficient utilization of the tool capacity of the process tools involved in the process flow under consideration. Enhancing efficiency of tool utilization may, in one aspect, be understood as a strategy for avoiding or reducing any situations in which process operations may be performed on the basis of a sophisticated expensive process tool, while the corresponding product may run into a WIP queue in a later manufacturing stage or may encounter a non-available process tool, thereby blocking precious tool capacity of the sophisticated tool with respect to other products, thereby unduly increasing cycle time of these products. Thus, contrary to many conventional approaches, in which control parameters for controlling the dispatching of products into a specific process operation are defined on a product-to-product basis thereby resulting in a control of individual tool groups and process operations, the subject matter disclosed herein provides an increased overview by "looking ahead" at least for a number of process steps and tools in order to locally control the number of products to be released into a specific process operation.

That is, a respective "work in progress" value may be efficiently determined on the basis of an increased amount of process information with respect to the current status of the process flow, wherein appropriately defined critical "work in progress" values, which may represent operation-specific limits for restricting the WIP and which may also reflect the overall production target, may be applied, thereby significantly enhancing the overall efficiency of the process flow. In particular, in highly complex manufacturing environments which comprise a plurality of re-entrant process sequences, in addition to very different and mutually interrelated process steps performed on sophisticated process tools with highly different operational behaviors, the operation-specific information "encoded" into the respective critical "work in progress" values may provide the possibility of enhancing currently existing control strategies, which may presently not provide a non-local evaluation of a complex process flow, as is typically encountered in semiconductor facilities. In some illustrative aspects disclosed herein, a process flow may be divided into appropriately selected sections of interrelated process operations, for which a section-specific critical "work in progress" value may be selected on the basis of the overall production target, so that a decision for releasing products into a specified first operation of a specific section may be based on the situation of a plurality of operations following the first operation, wherein the decision is based on the comparison between the respective critical value representing the plurality of operations in the section and the current status of the section under consideration. Thus, by dividing a highly complex process flow into individual sections of significantly reduced complexity, a single value may be used for obtaining a quantitative measure of a limit or desirable WIP for each section that has a "look ahead" behavior and thus provides an efficient means for deciding the dispatching of products at individual points within the process flow while nevertheless incorporating a global estimation of extended portions of the process flow. For instance, in semiconductor facilities, process operations performed on the basis of a specific mask set or lithography layer may represent appropriate sections for dividing the highly complex manufacturing process of semiconductor devices.

In other illustrative aspects, a throughput-related WIP value may be obtained for each process operation so as to indicate a target WIP value on the basis of which priorities of preceding and subsequent process operations may be determined.

One illustrative method disclosed herein relates to automatically controlling a process flow in a manufacturing environment. The method comprises determining a plurality of sections of the process flow performed in the manufacturing environment by using a plurality of process tools for processing products, wherein each of the plurality of sections corresponds to a group of interrelated processes. The method further comprises determining a maximum "work in progress" value for each of the plurality of sections on the basis of at least one section-specific characteristic and a characteristic related to a production target value of the process flow. Furthermore, the method comprises comparing, for each of the plurality of sections, a current "work in progress" value of a respective section with a respective maximum "work in progress" value associated with the respective section to provide a comparison result. Finally, the method comprises controlling a flow of products to each of the plurality of sections by using the comparison result.

A further illustrative embodiment disclosed herein relates to a method for automatically controlling a process flow of process operations in a manufacturing environment. The method comprises determining a critical "work in progress" value for each process operation on the basis of a characteristic related to a production target value of the process flow, wherein a critical "work in progress" value indicates a required "work in progress" value at each process operation to support the production target value. Furthermore, each critical "work in progress" value is compared with a current "work in progress" value of each process operation to provide a comparison result. When the comparison result indicates that a first process operation has a first current "work in progress" value that is greater than a critical "work in progress" value associated with the first process operation, a reduced priority value is generated for each of one or more process operations preceding the first process operation. Additionally, products are processed according to the one or more process operations on the basis of the reduced priority values.

An illustrative WIP control system disclosed herein comprises a process monitor configured to receive process information relating to a plurality of products and a plurality of process tools of a manufacturing environment, wherein the process monitor is further configured to determine a current WIP value for each of a plurality of process operations performed by the plurality of process tools. The control system further comprises a comparator configured to determine a comparison result indicating a deviation between the current WIP values and a plurality of limit WIP values that correspond to the plurality of process operations, wherein the limit WIP values indicate an upper limit for a WIP value required to meet a production target of the process flow. Additionally, the WIP control system comprises a process priority estimator configured to reduce a priority of at least some of the process operations by using the comparison result.

BRIEF DESCRIPTION OF THE DRAWINGS

The disclosure may be understood by reference to the following description taken in conjunction with the accompanying drawings, in which like reference numerals identify like elements, and in which.

Figure 1A:
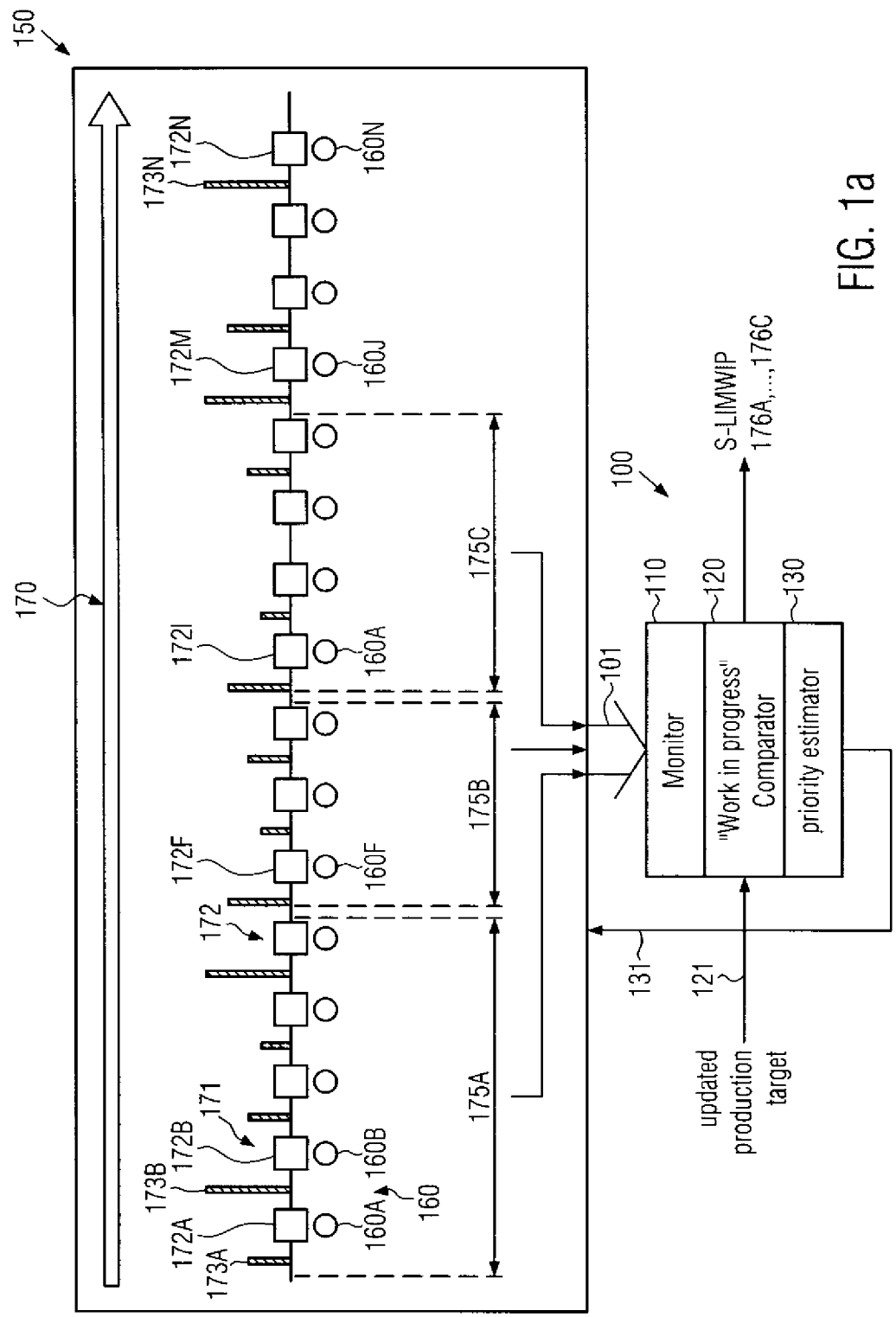
FIG. 1a schematically illustrates a manufacturing environment including a plurality of process tools for performing process operations according to a specified process flow in connection with a WIP control system, in which section-based limits for the WIP are used for obtaining appropriate priorities for dispatching products into the various sections, according to illustrative embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The subject matter disclosed herein provides techniques and systems for enhancing production control strategies by appropriately determining a priority for processing of substrates such that undue accumulation of products at specific points of the manufacturing flow may be reduced. For this purpose, the number of products currently being processed by the process tools of the manufacturing environment may be monitored and may be compared to appropriately selected limits for the currently being processed products, also referred to herein as "work in progress" or WIP, in order to obtain a quantitative measure for identifying undue material accumulation in the manufacturing environment. Based on the quantitative estimation, which thus provides a certain degree of predictability, the further dispatching of products into the manufacturing environment may be appropriately adapted, for instance, by blocking the release of products that may run into a WIP queue or which may encounter a non-available process tool, or any other event, wherein the corresponding process flow irregularities may be efficiently identified by the empirical data obtained from the manufacturing environment and the limit values. In particular, for re-entrant process flows, the available tool capacity may be utilized more efficiently, since by appropriately reducing the priority of products for which a high probability for running into WIP queues may have been evaluated, the tool capacity allocated for these products may now be re-allocated to other operations performed by the process tool under consideration.

In some illustrative aspects, an efficient strategy may be implemented by appropriately dividing the process flow, or at least a significant portion thereof, into smaller process flow sections containing a plurality of interrelated process operations, for which an appropriate limit for the work in process may be determined so as to reflect the overall production target and section-specific characteristics of the involved process operations. Consequently, each individual section may have an associated limit with respect to the WIP at any time, thereby enabling a highly predictive estimation of the entire process flow with respect to the control of the WIP. For example, the cycle time of a product passing through a specific section may be considered as a section-specific characteristic, which may therefore be efficiently used for determining an appropriate critical WIP value for the section under consideration. Furthermore, the overall production target may be encoded into the respective critical WIP value, for instance, by defining a desired amount of products to be processed within a specified time period, so that these values may be combined to obtain a meaningful critical WIP value. Based on these values, "overloaded" sections may be readily identified and, according to some illustrative aspects, the dispatching of products into these sections identified as "overloaded" sections may be blocked so that, for instance, the first process operation may no longer receive corresponding products. In some cases, a preceding section feeding the overloaded section under consideration may be controlled on the basis of recalculated priorities for the products under consideration. Furthermore, as is well-known, in highly complex semiconductor facilities, a plurality of re-entrant process sequences are typically encountered, in which the same process tool or tool group is used for different manufacturing stages. Thus, by blocking the dispatching of a specific product, the available tool capacity of one or more process tools used in the overloaded section may thus be allocated to the processing of other products or product types. In a similar manner, the priorities for processing products in other sections may be correspondingly adapted to obtain a desired amount of WIP in each of the sections to smooth the product stream in the manufacturing environment. In some illustrative aspects, the re-prioritizing of the dispatching of products may be performed in a substantially continuous manner, which may allow enhanced flexibility in appropriately adapting the overall process flow to obtain smooth control of the WIP in the various sections. In this way, a dynamically adaptable distribution of products within the manufacturing environment may be established, which thus enables a more sensitive adaptation to the intrinsic dynamic behavior of the process line as may be accomplished on the basis of conventional strategies, which may suffer from a lack of an efficient quantitative metric for restricting the WIP. For example, by continuously varying the critical WIP values, process line internal fluctuations, that is, product jams and phases of "depleted" products, may be reduced, thereby enhancing the overall throughput of the manufacturing environment.

In other illustrative aspects disclosed herein, a process-specific metric for limiting the WIP may be established such that the overall production target is also reflected in this value, which may therefore allow an assessment of the individual process operations, thereby also enabling the identification of "overloaded" process operations and corresponding related operations feeding the overloaded process operation under consideration. Thus, contrary to the above-described strategy, this approach provides enhanced "granularity" in identifying critical processes and appropriately prioritizing process operations connected thereto. For this purpose, a critical throughput for each process operation or a group of process operations may be determined such that a specified production target may be supported. For example, if the production target specifies a specific amount of products to be processed within a given time period, a corresponding required throughput per process operation may be calculated and may be used for identifying processes having an undue WIP value. Upon identification of an increased WIP value, correlated processes may be identified within the "neighborhood" of the process under consideration in order to reduce or block the dispatching of products into the identified process operations. Also, in this case, a highly efficient control of the WIP in the entire manufacturing process may be accomplished, wherein the available tool capacity may also be utilized more efficiently, since the release of products running into a WIP queue may be avoided for the benefit of increasing the tool capacity for other products.

It should be appreciated that in the following detailed description of further illustrative embodiments it may frequently be referred to the fabrication of semiconductor devices, since in this industrial field frequently a plurality of different product types are processed according to a highly complex overall process flow within a manufacturing environment comprising a plurality of different process tools, which may have very different characteristics with respect to the operational behavior in terms of the number of products that may be processed at the same time, the throughput of products through the tool and the like. Consequently, a manufacturing environment related to the fabrication of semiconductor devices or other microstructure features may represent an industrial environment in which the techniques and systems disclosed herein are highly advantageous, wherein it should be appreciated however that the subject matter disclosed herein may also be applied to other industrial fields in which products are produced in a highly complex process flow. Thus, the present disclosure should not be considered as being restricted to the fabrication of semiconductor devices, unless such restrictions are explicitly set forth in the appended claims.

FIG. 1*a* schematically illustrates a manufacturing environment 150 which is configured to produce one or more types of products according to a specific general process flow indicated as 170, representing a stream of products through the manufacturing environment 150, wherein the flow or stream 170 may comprise one or more "parallel" process flow branches 171, each of which may be dedicated to a specific product type. In one illustrative embodiment, the manufacturing environment 150 may represent a semiconductor facility in which one or more types of semiconductor devices may be manufactured corresponding to the overall process flow 170. For convenience, a single process flow 171 of the process flow 170 is schematically illustrated in FIG. 1*a* so as to comprise a sequence of process operations or processes 172A-172N which may also be collectively referred to as process operations 172. The process operations 172 may be performed by a plurality of process tools 160A-160N which may also be commonly referred to as process tools 160. As previously explained, one or more of the process tools 160 may perform two or more process operations 172. For instance, the process tool 160A may perform the process operation 172A and may also perform the process operation 172I. A corresponding situation may also be referred to as a re-entrant process flow, since the same process tool may be provided at various stages of the overall process flow 171. Moreover, with each of the process operations 172, a current WIP 173A-173N may be associated, which may represent the number of products currently processed in the respective tool or which may be stored in any product buffer associated with the process tool under consideration. Thus, the WIP values 173A-173N, collectively referred to as 173, may represent the current tool utilization with respect to the process flow 171. It should be appreciated that the process flow 171 may represent one of several different process flows, each of which may be associated with a specific product type, while, in other cases, the process flow 171 may represent the flow of products of any product type, wherein processes performed on the basis of substantially the same process recipes may be considered as the same process operations, even though different product types may result.

As previously explained, during the process flow 171, a certain amount of raw material may be released into the manufacturing environment 150 and may be passed through the process flow 171 so as to obtain processed products, such as semiconductor devices and the like. Due to the high degree of complexity of the process flow 171, in combination with many re-entrant process sequences performed on the basis of highly complex process tools, the density of products in the stream 171 may fluctuate in time and position, i.e., at different times at the same position, i.e., at the same process tool 160, very different amounts of WIP 173 may occur. Similarly, at the same time, at different locations, i.e., at different process tools 160, the WIP values 173 may significantly vary. Consequently, in some areas of the process flow 171, the associated WIP values 173 may be rather high, thereby resulting in a corresponding queue time for further products moving towards the area of increased WIP. Generally, it may be desirable to smooth the stream of products through the manufacturing environment 150, thereby reducing the overall cycle time of products and increasing the reliability and predictability of the entire manufacturing process. Consequently, according to the principles disclosed herein, an efficient mechanism is provided in which the flow of products in the environment 150 may be controlled, alternatively or additionally to conventional strategies, by providing a more global view with respect to the WIP values 173 so as to take into consideration the neighborhood of a certain point of the process flow when deciding on the release of products at this point.

For this purpose, in one illustrative embodiment, the process flow 171 is divided into sections 175A, 175B, 175C, which may represent interrelated process operations 172, to enable a section-specific assessment of the WIP value of a corresponding section, for instance, on the basis of a mean value of all WIP values 173 of a specified section. For example, the sections 175A, 175B, 175C may be selected such that functionally related process steps are combined, wherein, at corresponding "boundaries" between individual sections, substantially none or significantly relaxed queue time constraints may exist. That is, the sections 175A, 175B, 175C may be selected such that an intentionally introduced delay or complete blocking of supply of products from one section to the subsequent section may not negatively influence the quality of the products under consideration. In one illustrative embodiment, the environment 150 may represent a semiconductor facility wherein the sections 175A, 175B, 175C correspond to different mask sets and the corresponding involved manufacturing process to pattern a device layer on the basis of a corresponding lithography process. For instance, the process operations 172A, 172F, 172I may represent respective "gate" process operations for the sequences 175A, 175C and 175C, respectively, to start the production of a new device layer. As shown, the process tools used for the first process operations of the sections 175A, 175B, 175C may be the tools 160A, 160F and again 160A since, as previously explained, a plurality of re-entrant sequences may be included in the process flow 171. Thus, for estimating the WIP related to the plurality of process operations in one illustrative embodiment the current status of the process flow 171 in each section may be efficiently determined by summing over all WIP values of the respective section. It should be appreciated that the status of the process flow 171 with respect to the WIP may be based on any appropriate combination of the individual WIP values represented in any of the sections 175A, 175B, 175C. Moreover, as previously explained, since the sections 175A, 175B and 175C may differ with respect to section-specific characteristics, which may be caused by different process recipes and the like, although one or more process tools may be repeatedly used in different sections, the corresponding WIP values of the various sections may not be directly compared with each other to obtain information with respect to identifying any "overloaded" sections. Thus, a representative critical WIP value or a WIP limit may be established on the basis of section-specific characteristics and also on the basis of an overall production target of the process flow 171.

For instance, in one illustrative embodiment, the cycle time of each section 175A, 175B, 175C may be combined with an appropriate production target, such as the number of products to be provided within a predefined time period. For example, the section-internal cycle time multiplied by the target product number to be provided within a specified time interval, for instance per shift, may thus represent a section-specific quantitative value for estimating the current status of the section under consideration. Furthermore, a scaling factor may further be applied to provide a certain safety margin with respect to avoiding insufficient material supply to a specific section, wherein an appropriate value for a corresponding scaling factor may be selected on the basis of experiment and the like. For instance, an appropriate critical WIP value or sectional limit for the WIP may be determined by:

$$\text{S-LIMWIP} = F \times DT_{shift} \times CT_{section}$$

wherein F represents the scaling factor, $DT_{shift}$ represents the overall production target with respect to a specific operational period of the manufacturing environment 150, such as a shift, and $CT_{section}$ represents a cycle time per section. For an exemplary semiconductor facility, the total cycle time for a lithography layer may be approximately 1.1 day, while a desired number of products to be passed through the section or layer may be 450 substrates. For a scaling factor of, for instance, 2.0, the critical WIP value may be approximately 1000 products for the section under consideration, such as the section 175A. Thus, similar calculations may be performed for any of the sections 175A, 175B, 175C, thereby obtaining individual critical WIP values for each of the sections 175A, 175B, 175C. It may, for instance, be assumed that presently the sum of the WIP values for the section 175A may be approximately 2000 substrates, while the corresponding critical WIP value may be 1000, as previously described, thereby rendering the section 175A as an overloaded section, which may not receive further products corresponding to the process flow 171. It may further be assumed that the other sections 175B, 175C may have total WIP values that may be less than a correspondingly calculated critical WIP value, thereby indicating a valid operational state with respect to the WIP.

According to illustrative embodiments, the manufacturing environment 150 may be operatively connected to a WIP control system 100 configured to receive process information 101 from the plurality of process tools 160, which may at least indicate the associated WIP values 173. For example, the process information 101 may include the WIP values of the sections 175A, 175B, 175C or any other appropriate value for representing the status of each of the sections with respect to the WIP contained therein. In other cases, the control system 100 may be configured to determine an appropriate representation of the WIP of each of the sections 175A, 175B, 175C. For this purpose, in one illustrative embodiment, the system 100 may comprise a process monitor 110 configured to receive the process information 101 continuously, or at least on a regular basis, and extract the desired information with respect to the WIP. By obtaining the representative values 173, at least on a regular basis, the system 100 may therefore enable an automated updating of the status of the process flow 171. It should be appreciated that the communication of the control system 100 with the manufacturing environment 150 may be established on the basis of well-known techniques, in which each of the process tools 160 may be connected via an appropriate interface to the system 100 or to a supervising MES (manufacturing execution system) (not shown), as is typically provided in advanced semiconductor facilities.

Moreover, the control system 100 may comprise a comparator 120 operatively connected to the monitor 110 to obtain therefrom current WIP values representing the sections 175A, 175B, 175C. For instance, the sum of the individual values 173 of each process tool belonging to a respective section may be provided by the monitor 110. Furthermore, the comparator 120 may receive additional process information 121, which may comprise updated production target values, such as the desired number of products to be processed within a specified time period, which may, for instance, be based on customers' demand or other economical constraints and the like. The comparator 120 may be configured to determine an appropriate overall production target value for at least each of the sections 175A, 175B, 175C for a specified time period that is appropriate for determining an appropriate limit value for the WIP for each of the sections 175A, 175B, 175C, as previously explained. For example, the process information 121 may be used for determining an internal production target per day or any other appropriate time interval considered appropriate for determining a respective critical WIP value for each of the sections 175A, 175B, 175C. The comparator 120 may further be configured to determine from the information 121 and the current WIP values corresponding to each of the sections 175A, 175B, 175C appropriate section limit WIP values 176A, ..., 176C, also indicated as S-LIMWIP, which may be provided to external sources, such as a company-internal communication network and the like. As previously explained, the critical WIP values 176A, ..., 176C may be defined to reflect the section-specific characteristics as well as the overall production target, which may be accomplished on the basis of, for instance, section-specific cycle times of products and the respective production target per time interval, as previously explained. Based on these values, the comparator 120 provides a comparison result for each of the sections 175A, 175B, 175C indicating whether or not each of the sections 175A, 175B, 175C is within a valid range or not. For instance, the comparator 120 may identify any section 175A, 175B, 175C that exceeds the limit defined by the associated critical WIP value 176A, ..., 176C.

For the above-specified process scenario, i.e., 2000 WIP in the section for a critical WIP value of 1000, the comparator 120 may identify the section 175A as a section containing too much WIP. A respective quantitative estimation of the WIP status of each of the sections 175A, 175B, 175C may be obtained in a substantially continuous manner, or at least on a regular basis, depending on how often the process information 101 supplied to the monitor 110 is available. For example, the status information with respect to the WIP status of the environment 150 may be updated on an hourly basis and may also be communicated to a company-internal communication network and the like.

Furthermore, the control system 100 may further comprise a priority estimator 130 connected to the comparator 120 to receive therefrom the quantitative estimation of the WIP status of each of the sections 175A, 175B, 175C and to determine therefrom an appropriate priority for products to be released into each of the respective sections 175A, 175B, 175C, i.e., products to be released to the first or gate process operations 172A, 172F and 172I. In some illustrative embodiments, the priority estimator 130 may assign the priority value of "0" to products to be released into sections that are indicated by the comparator 120 as sections having a WIP that is too high, thereby avoiding the delivery of the respective products into the gate operation of the respective section. For example, as previously explained, conventional process control strategies may be applied, for instance, in the form of dispatch lists and the like, which may, in turn, be based on process-internal specifics and the local conditions at each of the process operations 173. Thus, by dividing the process flow 171 into several sections 175A, 175B, 175C, a plurality of process operations is taken into consideration within each section in determining the priority for delivering substrates to the respective section. Thus, a certain degree of "look ahead" ability is incorporated when defining the priority for products for entry into each of the sections 175A, 175B, 175C.

As explained above, in some embodiments, the priority estimator 130 may provide appropriate priority values so as to not completely block the entry of products into the operation of an overloaded section, that is, for the process scenario described above, the process operation 172A, but may appropriately reduce the priority of products belonging to the process flow 171, thereby providing additional process resources in terms of transport capacity and the like for other products in a smoother fashion compared to a "digital" response to the overload situation in the section 175A. For example, in the above-described process scenario, the process tool 160A, which is also used for the process operation 172I in the section 175C, may therefore be re-allocated so as to be preferably used for products of the flow 171 corresponding to the process operation 172I or may be used with increased capacitance for other products of other process flows, which may also use the process tool 160A. Consequently, the process capacity of the tool 160A may be used more efficiently by avoiding or reducing the processing of substrates in the section 175A, which already has a high amount of WIP contained therein. Thus, in some illustrative embodiments, the priority estimator 130 may provide control messages 131 to the manufacturing environment 150, i.e., to a corresponding supervising control system, in order to direct a material flow to the process tool 160A that reflects the re-ordering in the priorities for processing products in the tool 160A. In some cases, the controller 100 may directly control the distribution of products to the various sections 175A, 175B, 175C, while, in other cases, an indirect control may be established by providing updated priority values for the products within the manufacturing environment 150.

Figure 1B:
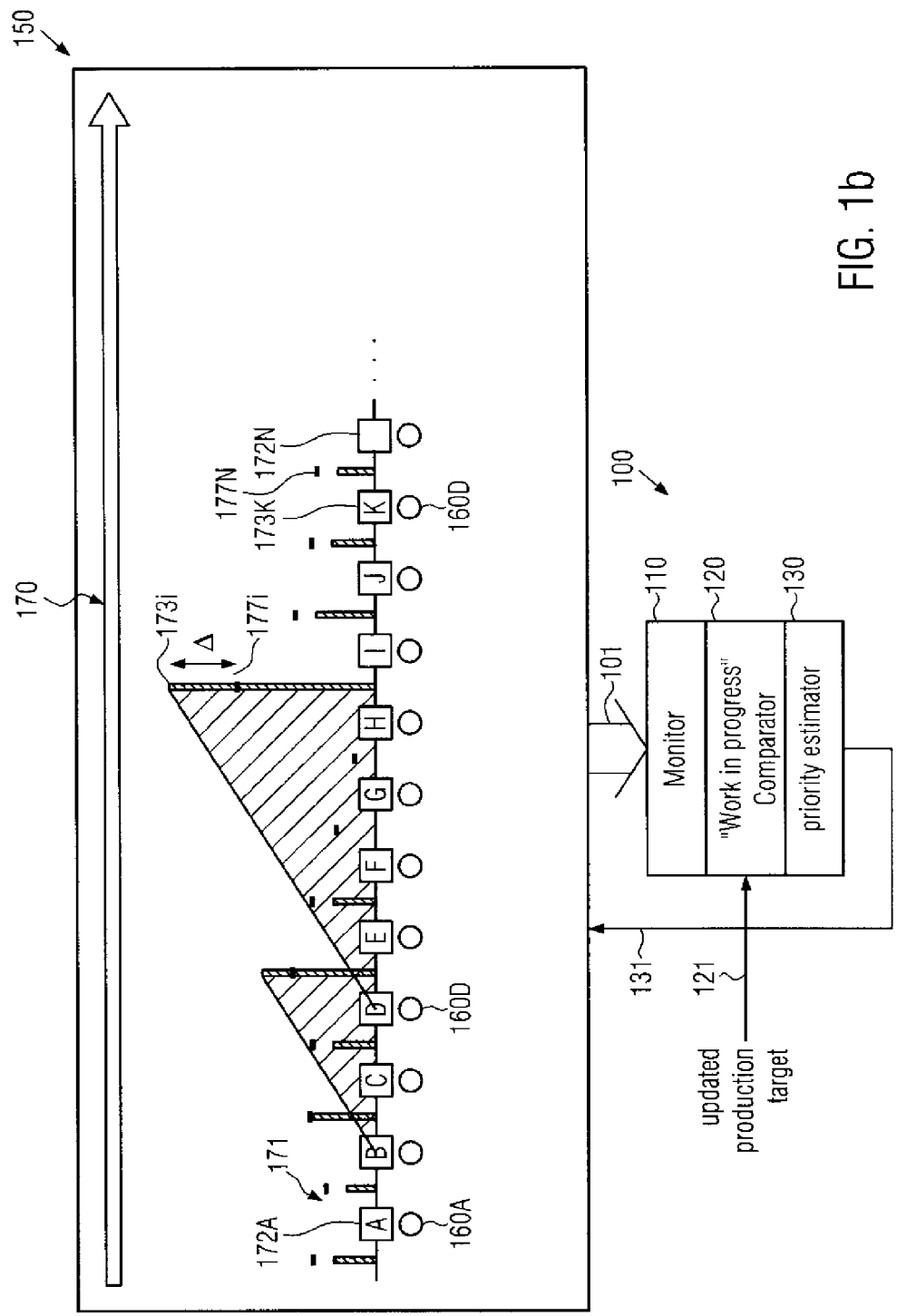
FIG. 1b schematically illustrates the manufacturing environment when the dispatching of products into the process flow may be controlled on the basis of a throughput-related critical WIP value, according to further illustrative embodiments.

FIG. 1b schematically illustrates the manufacturing environment 150 according to further illustrative embodiments. Also in this case, the environment 150 may be operatively connected to the WIP control system 100 so as to receive appropriate process information 101 indicating the current status with respect to the WIP of each of the processes 172. In this case, an individual amount of required WIP is assigned to each process operation depending on the operation's specific characteristics and the overall production target, as also discussed above. For example, based on the respective capacity of each of the process operations 172A-172N, and based on the production target, for instance, the number of products to be processed within a specific time period, a required number of product process events per time may be calculated in order to meet the overall production target. Consequently, a required amount of material per operation may be determined, indicated as 177A-177N, which may be determined by the comparator 120 on the basis of the process information 121, similarly as previously explained with respect to the embodiment shown in FIG. 1a. Consequently, based on the throughput-related critical WIP values 177A-177N, the current WIP situation for each of the process operations 172 may be estimated by the comparator 120 by comparing the current WIP values 173A-173N contained in the process information 101 with the values 177A-177N. Thus, the priority estimator 130 may provide appropriate updated priority values so as to reduce the priority for products to be released into a process operation feeding a process operation that has been identified by the comparator 120 as having an invalidly high WIP value 173. In this way, a high degree of "granularity" for estimating the WIP situation of the processes 172 may be accomplished, while nevertheless providing a "look ahead" characteristic that may be used for enhancing the overall process control, as previously described. For instance, in the process scenario shown in FIG. 1b, it may be assumed that the process operations 172I and 172D may exceed the respective throughput related limits 177I and 177D, while the remaining process operations may be within a valid range. Moreover, as previously explained with reference to FIG. 1a, the process tools 160A-160N may be used for different operations due to re-entrant process scenarios, wherein it may be assumed that, for instance, the process tool 160D may also be used for the process operation 173K.

In order to adapt the process flow 171 to the currently determined required WIP values 177A-177N, one or more proceeding operations may be identified, which are "in the vicinity" of the operations 173I and 173E, which have been identified by the comparator 120 as having an invalid WIP value. The relevant "feeding" operations may be determined on the basis of the WIP values of the operations 173E and 173I and the cycle time of the preceding operations 172A-172H. That is, if the current WIP value 173I may be restricted to the critical value 177I, the amount Δ may determine, in combination with the cycle times of the proceeding operations, how far the WIP amount Δ "reaches" back in the flow and thus creates a "cycle time shadow," indicating all operations that would further contribute to the WIP within a process time required for "consuming" the amount Δ in the tool 173I.

In other cases, the total WIP value 173I may be used for calculating a respective "cycle time shadow" in order to determine a first one of the preceding operations that is just still within the "cycle time shadow" of the operation 173I. Thus, preceding operations, such as the operations 173D to 173H, may be identified as being within the cycle time shadow of the operation 173I. Consequently, these operations may be identified by the comparator 120 and may be assigned a reduced priority or priority "0" by the priority estimator 130 for products corresponding to the process flow 171 and moving toward the process operation 172I.

Similarly, the corresponding number of the preceding operations within the respective cycle time shadow of the operation 172E may be identified. Consequently, by identifying the various preceding operations, that is, the operations feeding the WIP overload within the time interval required to reduce the WIP overload, a "look ahead" behavior is obtained with respect to the point of view of these preceding operations, since products of the flow 171 released into one of these operations would run into a WIP queue exceeding the required value. As shown, the cycle time shadows may overlap in the process scenario represented by FIG. 1b, thereby increasing the total shadowed preceding area of the flow 171.

As previously explained with respect to the section-related critical WIP values 176A, . . . , 176C, also in this case, the priority estimator 130 may provide priority values 0, thereby blocking the delivery of substrates corresponding to the process flow 171 to respective process operations identified as being within the corresponding cycle time shadow, while, in other embodiments, appropriately selected intermediate priority values may be established, thereby providing the possibility of controlling the WIP values in a highly dynamic manner. Furthermore, tool capacity may be used more efficiently, in that, for instance, the process tool, which is within the cycle time shadows of the process operations 172I and 172E may be used to serve the operation 173K that is outside the total cycle time shadow, thereby preferring the processing of products that may not run into an increased WIP queue. It should be appreciated that the process flow 171 may represent one of several process flows, wherein some or all of the process tools 160A-160N may be used in several process flows. Also, in this case, the respective tool capacity corresponding to operations that are identified to be within one or more cycle time shadows may be assigned to other process operations within the same process flows, as in the case of the operation 173K, or to corresponding process operations of parallel process flows of the overall process flow 170. Similarly, as described before with reference to FIG. 1a and the section-based WIP assessment, the throughput-related critical values 177A-177N may be updated in any appropriate manner so as to reflect updated overall production targets and the re-distribution of material flowing within the environment 150.

As a result, the subject matter disclosed herein provides systems and methods for controlling the WIP in operations within a highly complex manufacturing environment, which may include re-entrant processes and shared process tools, in that appropriately defined limits for the WIP may be used that enable a more "global" view with respect to the current situation. For this purpose, appropriate WIP limits or critical values may be determined which include the characteristics of a plurality of related processes or which identify a plurality of related "feeding" operations to enable the reduction of priority of products moving towards an increased WIP queue, thereby decelerating the accumulation of respective products and thus enabling the smoothing of the WIP across the entire process flow, while also enhancing the efficiency of tool utilization. That is, products, such as semiconductor lots, will not be processed at operations that already have sufficient products in their WIP queues or which may contribute to increasing the WIP even if their own WIP is within the limits. In this way, any shared tools may be assigned to other operations which do not provide products towards an increased WIP queue, thereby reducing the overall cycle time of products compared to conventional strategies, in which the prioritizing of products may be based on local WIP values. Furthermore, the techniques and systems described herein may be efficiently combined with other common control paradigms, as previously explained, which may support additional overall manufacturing targets. Furthermore, the techniques disclosed herein may be implemented in the form of fully automated systems, thereby providing the possibility of controlling the entire manufacturing environment in a automatic manner.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of automatically controlling a process flow in a manufacturing environment, the method comprising:
   determining a plurality of sections of said process flow performed in said manufacturing environment by using a plurality of process tools for processing products, each of said plurality of sections corresponding to a group of interrelated processes;
   determining a maximum work in progress value for each of said plurality of sections on the basis of at least a section-specific characteristic and a characteristic relating to a production target value of said process flow;
   for each of the plurality of sections, comparing, in a control system, a current work in progress value of a respective section with a respective maximum work in progress value associated with said respective section to provide a comparison result; and
   controlling, using the control system, a flow of products to each of said plurality of sections by reducing priorities for releasing substrates from a subset of the plurality of sections into a subsequent section when said comparison result indicates that the current work in progress value of the subsequent section is larger than the respective maximum work in progress value associated with the subsequent section.

2. The method of claim 1, wherein controlling said flow of products to each of said plurality of sections comprises assigning a priority to each product of said flow of products and controlling dispatching of each product in the flow into a first process tool corresponding to a first process of a respective section on the basis of said priority.

3. The method of claim 2, further comprising scheduling said flow of products through said plurality of sections on the basis of said priorities.

4. The method of claim 1, further comprising blocking a dispatch of the subset by reducing priorities for releasing the substrates from the subset to zero.

5. The method of claim 1, wherein at least one process tool is used to perform a first process in a first one of said plurality of sections and a second process in a second one of said plurality of sections.

6. A method of automatically controlling a process flow in a manufacturing environment, the method comprising:
   determining a plurality of sections of said process flow performed in said manufacturing environment by using a plurality of process tools for processing products, each of said plurality of sections corresponding to a group of interrelated processes;
   determining a maximum work in progress value for each of said plurality of sections on the basis of at least a section-specific characteristic and a characteristic relating to a production target value of said process flow;
   for each of the plurality of sections, comparing, in a control system, a current work in progress value of a respective section with a respective maximum work in progress value associated with said respective section to provide a comparison result; and
   controlling, using the control system, a flow of products to each of said plurality of sections by using said comparison result, wherein at least one process tool is used to perform a first process in a first one of said plurality of sections and a second process in a second one of said plurality of sections, and wherein said process tool is controlled to perform said second process while rejecting requests for said first process when the work in progress values of said first and second sections are higher and lower, respectively, compared to said maximum work in progress value.

7. The method of claim 5, wherein said manufacturing environment is configured to process microstructure devices.

8. The method of claim 7, wherein each of said plurality of sections corresponds to processes performed on the basis of a different lithography mask set.

9. The method of claim 8, wherein said maximum work in progress value is determined on the basis of an overall production target output per time unit of said manufacturing environment and a cycle time of a product for passing through a respective section.

10. A method of automatically controlling a process flow comprising a plurality of process operations in a manufacturing environment, the method comprising:
    determining a critical work in progress value for each process operation on the basis of a characteristic related to a production target value of said process flow, said critical work in progress value indicating a required work in progress value at each process operation to support said production target value;
    comparing, in a control system, each critical work in progress value with a current work in progress value of each process operation to provide a comparison result;
    when said comparison result indicates that a first process operation has a first current work in progress value that is greater than a critical work in progress value associated with said first process operation, generating, using the control system, a reduced priority value for each of a plurality of process operations preceding said first process operation; and
    processing products according to the plurality of process operations on the basis of said reduced priority values.

11. The method of claim 10, further comprising establishing a dispatch list for at least some of said process operations on the basis of said comparison result.

12. The method of claim 10, further comprising performing at least one further process flow by using process tools used in said process flow and increasing a priority for performing specific process operations of said at least one further process flow when said specific process operations are performed by one or more process tools that perform said one or more process operations preceding said first process operation.

13. The method of claim 10, wherein said manufacturing environment is configured to process semiconductor devices.

14. The method of claim 10, further comprising automatically updating said work in progress value for each of said process operations on a regular basis.

15. A method of automatically controlling a process flow comprising a plurality of process operations in a manufacturing environment, the method comprising:
- determining a critical work in progress value for each process operation on the basis of a characteristic related to a production target value of said process flow, said critical work in progress value indicating a required work in progress value at each process operation to support said production target value;
- comparing, in a control system, each critical work in progress value with a current work in progress value of each process operation to provide a comparison result;
- when said comparison result indicates that a first process operation has a first current work in progress value that is greater than a critical work in progress value associated with said first process operation, generating, in the control system, a reduced priority value for each of one or more process operations preceding said first process operation; and
- processing products according to said one or more process operations on the basis of said reduced priority values, wherein generating a reduced priority value for each of said one or more preceding process operations comprises estimating a number of preceding process operations on the basis of said comparison result and a cycle time of process operations preceding said first process operation.

16. A method of automatically controlling a process flow comprising a plurality of process operations in a manufacturing environment, the method comprising:
- determining a critical work in progress value for each process operation on the basis of a characteristic related to a production target value of said process flow, said critical work in progress value indicating a required work in progress value at each process operation to support said production target value;
- comparing, in a control system, each critical work in progress value with a current work in progress value of each process operation to provide a comparison result;
- when said comparison result indicates that a first process operation has a first current work in progress value that is greater than a critical work in progress value associated with said first process operation, generating, in the control system, a reduced priority value for each of one or more process operations preceding said first process operation; and
- processing products according to said one or more process operations on the basis of said reduced priority values, wherein said first process operation and a second process operation are performed by a first process tool and wherein the method further comprises reducing priority for performing said first process operation and increasing priority for performing said second process operation, when said second operation is not one of said one or more preceding process operations.

17. The method of claim 16, wherein said first process tool is controlled to cease performing said first process operation.

18. A method of automatically controlling a process flow comprising a group of interrelated processes in a manufacturing environment, the method comprising:
- determining, in a control system, a cycle time shadow for a first process in the process flow when current work in progress (WIP) material for the first process exceeds a maximum WIP material level assigned to the first process, wherein the cycle time shadow indicates preceding processes that provide WIP material to the first process during a time required to consume a selected amount of WIP material using the first process; and
- reducing, using the control system, priorities for releasing WIP material from preceding processes in the cycle time shadow.

19. The method of claim 18, wherein determining the cycle time shadow comprises determining the preceding processes that provide WIP material to the first process during a time required to process WIP material in excess of the maximum WIP material level.

20. The method of claim 18, wherein determining the cycle time shadow comprises determining the preceding processes that provide WIP material to the first process during a time required to process the current WIP material.

21. The method of claim 18, wherein determining the cycle time shadow comprises determining the cycle time shadow using cycle times for processing WIP material in the preceding processes.

* * * * *